3,657,268
PROCESSES FOR IMIDAZO[2,1-a]ISOINDOLES

George A. Cooke, Denville, Harry A. Dugger, Morristown, and William J. Houlihan, Mountain Lakes, N.J., assignors to Sandoz-Wander, Inc., Hanover, N.J.
No Drawing. Filed Jan. 29, 1970, Ser. No. 6,958
Int. Cl. C07d 49/34
U.S. Cl. 260—309.6                                    7 Claims

ABSTRACT OF THE DISCLOSURE 5-substituted - 5 - hydroxy-2,3-dihydro-5H-imidazo[2,1-a]isoindoles, e.g., 5 - (4-chlorophenyl)-2,3-dihydro-5-hydroxy-5H-imidazo[2,1-a]isoindole, are prepared by oxidizing corresponding imidazo[2,1-a]isoindoles. These compounds are useful as appetite depressants and psychic energizers.

---

This invention relates to imidazo [2,1-a]isoindoles. More particularly the invention concerns processes for preparing 5-substituted - 5-hydroxy-2,3-dihydro-5H-imidazo[2,1-a]isoindoles of the formula

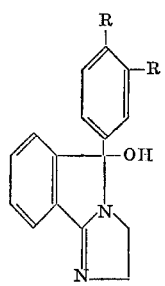

(I)

where each R, independently, represents hydrogen or halo of atomic weight about 19–36.

These isoindoles (I) are prepared by treating compounds of the formula

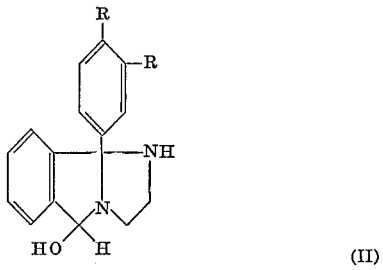

(II)

where R is as previously defined, with an oxidizing agent. The process is performed in solvent at a temperature of about 20–50° C., conveniently at room temperature, for about 10–80 hours, preferably about 15–50 hours. The oxidizing agents useful are air, oxygen, hydrogen peroxide and other peroxides of the general formula R'—OOH where R' represents lower alkyl, i.e., alkyl 1–6 carbon atoms such as ethyl, isopropyl, t-butyl and the like, phenloweralkanoyl such as benzyl and the like, and lower alkanoyl, e.g. acetyl. The air or oxygen is preferably free of water at the time of use. Inert polar solvent may be used as the solvent, namely a lower alkanol, i.e., alkanols having 1–5 carbon atoms, except that when hydrogen peroxide is used as the oxidizing agent the lower alkanol can also be admixed with water and the mixture used as solvent. Examples of the lower alkanols which may be used include methanol, ethanol, isopropanol, butanol and the like.

As an additional aspect of this invention, compounds (II) are readily converted to compounds of the formula

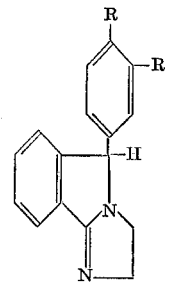

(III)

where R is as earlier defined by dehydration in inert gas, e.g. nitrogen, in polar inert solvent such as lower alkanol, e.g. methanol, ethanol, propanol or butanol at about 10° to 45° C. for about 6 to 48 hours.

The compounds (III) may then be converted to compounds (I) by contact in solution with air or oxygen, and the reaction may be enhanced and good yields of compound (I) obtained by bubbling air or oxygen at room temperature into a solution of a compound of Formula III in solvent, preferably lower alkanol, for about 2–6 hours. The resulting compounds (I) may be recovered using conventional techniques.

According to an additional aspect of this invention, compounds (II) may be converted to compounds (III) in inert atmosphere, such as nitrogen gas, and in inert solvent such as hydrocarbons, e.g., toluene or xylene, or chlorinated hydrocarbons, e.g., methylene chloride or chloroform, with metal bromides or chlorides or oxychlorides or bromides, such as thionyl chloride, phosphorous oxychloride, titanium tetrachloride, aluminum chloride, thionyl bromide, and the like.

This reaction may be conducted at a temperature of about 15°–100° C., preferably 40°–80° C., for about 1–5 hours. Neither the reaction temperature nor the solvent used is critical.

The preparation of the compounds (II) is generally described in German patent application No. 1,926,477, entitled "Preparation of Imidazo-isoindols," published Nov. 27, 1969.

The compounds of Formula I are useful because they possess pharmacological activity in animals. In particular, they possess appetite depressant activity as indicated by their activity in rat given 25 mg./kg. of active agent and tested by use of the free-feeding method described by Randall, et al. (J.P.E.T., 129, 163, 1960) whereby 16 groups of six male Wistar rats are deprived of food for 18 hours but receive water ad libitum. Consumption of ground food is then measured over a four hour period following oral administration of the agent tested. Accordingly, these compounds may be used as anorexigenic agents. The compounds of this invention also possess central nervous system stimulant activity and can be used as psychic energizers as indicated by their activity in mouse given 12.5 mg./kg. of active compound and tested by use of a 30 word adjective check sheet method basically as described by Irwin, S. (Gordon Research Conference, Medicinal Chemistry, 1959), and Chen (Symposium on Sedative and Hypnotic Drugs, Williams and Wilkins, 1954).

For the above-mentioned uses, the dosage administered will, of course, vary depending upon the mode of administration and treatment desired. However, in general, satisfactory results are obtained for each of the above-mentioned uses when the compounds are administered at a daily dosage of from about 0.02 milligram to about 25 milligrams per kilogram of animal body weight, preferably given in divided doses, 2 to 4 times a day, or in sustained release form. For most large mammals the daily dosage is generally in the range of from about 1 milligram to about 25 milligrams, and dosage forms suitable for internal administration comprise from about 0.25 milligram to about 12.5 milligrams of the compound admixed with a solid or liquid pharmaceutical carrier or diluent.

EXAMPLE 1

5-(4-chlorophenyl)-2,3-dihydro-5-hydroxy-5H-imidazo[2,1-a]isoindole

A stream of air, dried by passage through a tower of calcium sulphate, is bubbled into an agitated suspension of 8.3 g. of 9b-(4-chlorophenyl)-2,3,5,9b-tetrahydro-1H-imidazo[2,1-a]isoindol-5-ol in 250 ml. of propanol for 48 hours at room temperature, At the end of this period the resulting product is isolated by filtration, and is recrystallized from methanol to provide 5-(4-chlorophenyl)-2,3-dihydro-5-hydroxy-5H-imidazo[2,1 - a]isoindole, M.P. 198–200° C.

When the above procedure is carried out and oxygen is used in place of air, the same product is again obtained.

EXAMPLE 2

To a suspension of 8.3 g. of 9b-(4-chlorophenyl)2,3,5, 9b-tetrahydro-1H-imidazo[2,1-a]isoindol-5-ol in 50 ml. of methanol is added 5.5 ml. of a 30% aqueous solution of hydrogen peroxide. The resulting mixture is stirred at room temperature for 24 hours. The product is collected at the end of this period by filtration and recrystallized from methanol to provide 5-(4-chlorophenyl)-2,3-dihydro-5-hydroxy - 5H - imidazo[2,1-a]isoindole; M.P. 198°–200° C.

When the above procedure is carried out and t-butylperoxide, benzoyl-peroxide or acetylperoxide is used in place of hydrogen peroxide, the same product is again obtained.

When the procedure of each of Examples 1 and 2 is carried out using 9b-(3,4-dichlorophenyl)-2,3,5,9b-tetrahydro-1H-imidazo[2,1-a]isoindol-5-ol, 9b-phenyl-2,3,5,9b-tetrahydro-1H-imidazo[2,1-a]isoindol-5-ol, or 9b-(m-fluorophenyl)-2,3,5,9b-tetrahydro - 1H - imidazo[2,1-a]isoindol-5-ol in place of 9b-(4-chlorophenyl)-2,3,5,9b-tetrahydro-1H-imidazo[2,1-a]isoindol-5-ol there is obtained 5-(3,4 - dichlorophenyl)-5-hydroxy-2,3-dihydro - 5H - imidazo[2,1-a]isoindol (M.P. 200°–201° C.), 5-hydroxy-5-phenyl - 2,3 - dihydro-5H-imidazo[2,1-a]isoindole (M.P. 197°–199° C.), or 5-(m-fluorophenyl)-5-hydroxy-2,3-dihydro-5H-imidazo[2,1-a]isoindole (M.P. 207°–209° C.), respectively.

EXAMPLE 3

5-(4-chlorophenyl)-2,3-dihydro-5H-imidazo[2,1-a]isoindole hydrochloride

A stirred solution of 2.0 g. of 9b-(4-chlorophenyl)-2,3,5,9b-tetrahydro-1H-imidazo[2,1-a]isoindol-5-ol in 150 ml. of ethanol under nitrogen is agitated for 15 hours at 35° C. The solution is treated with hydrogen chloride gas at room temperature to provide 5-(4-chlorophenyl)-2,3,-dihydro-5H-imidazo[2,1-a]isoindole hydrochloride; M.P. 280° C.

EXAMPLE 4

5-(4-chlorophenyl)-2,3-dihydro-5H-imidazo[2,1-a]isoindole hydrochloride

A stirred solution of 2.0 g. of 9b-(4-chlorophenyl)-2,3,5,9b-tetrahydro-1H-imidazo[2,1-a]isoindol-5-ol in 150 ml. of chloroform is treated dropwise with a solution of 1.0 g. of thionyl chloride and 8.0 ml. of chloroform. The solution is refluxed for 2 hours and then allowed to cool to room temperature. The resultant precipitate is filtered to give 1.65 g. (78%) of 5-(4-chlorophenyl)-2,3-dihydro-5H-imidazo[2,1-a]isoindole hydrochloride; M.P. 280° (dec.).

When the above process is carried out and thionyl bromide, phosphorous oxychloride, aluminum chloride or titanium tetrachloride is used in place of thionyl chloride, the identical product is again obtained.

EXAMPLE 5

5-(4-chlorophenyl)-5-hydroxy-2,3-dihydro-5H-imidazo[2,1-a]isoindole

A solution of 5-(4-chlorophenyl)-2,3-dihydro-5H-imidazo[2,1-a]isoindole (0.5 g.) in tetrahydrofuran is allowed to stand for two weeks at room temperature to obtain 5-hydroxy-5-(4-chlorophenyl) - 2,3 - dihydro - 5H - imidazo [2,1-a]isoindole, M.P. 198°–201° C.

What is claimed is:

1. A process for preparing a compound of the formula

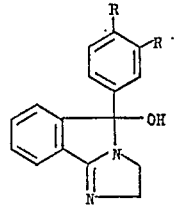

which comprises treating a compound of the formula

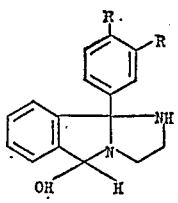

where each R, independently, represents hydrogen or halo of atomic weight about 19 to 36, with an oxidizing agent selected from the group consisting of air, oxygen, hydrogen peroxide and a peroxide of the formula R′—OOH where R′ represents loweralkyl, phenloweralkanoyl, or loweralkanoyl, in inert polar solvent at a temperature of about 20–50° C.

2. A process according to claim 1 wherein the oxidizing agent is air or oxygen.

3. A process according to claim 1 wherein the oxidizing agent is hydrogen peroxide.

4. A process according to claim 3 wherein the process is conducted at about room temperature.

5. A process for preparing a compound of the formula

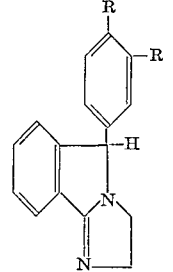

where each R, independently, represents hydrogen or halo of atomic weight about 19 to 36, which comprises dehydrating a compound of the formula

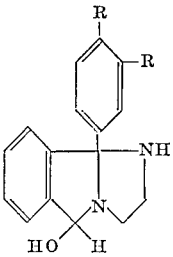

where R is as previously defined, in polar inert solvent and in inert atmosphere.

6. A process for preparing a compound of the formula

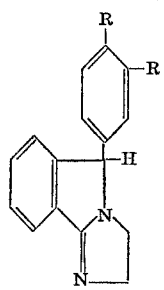

where R represents H or halo of atomic weight about 19–36, which comprises treating a compound of the formula

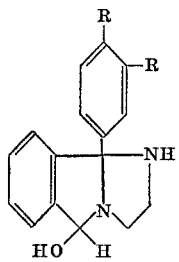

where R is as defined above, in inert solvent with a dehydrating agent comprising a metal bromide, metal chloride, oxybromide or oxychloride.

7. A process according to claim 6 wherein the dehydrating agent is thionyl chloride.

References Cited
UNITED STATES PATENTS 3,526,636   9/1970   Houlihan _____ 260—309

HENRY R. JILES, Primary Examiner

G. T. TODD, Assistant Examiner

U.S. Cl. X.R.

260—309.7; 424—273